(12) United States Patent
Gallup

(10) Patent No.: US 8,424,600 B2
(45) Date of Patent: Apr. 23, 2013

(54) METHODS AND SYSTEMS FOR TREATING SUBTERRANEAN WELLS

(75) Inventor: Darrell L. Gallup, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 258 days.

(21) Appl. No.: 12/786,141

(22) Filed: May 24, 2010

(65) Prior Publication Data

US 2011/0287985 A1 Nov. 24, 2011

(51) Int. Cl.
*E21B 37/06* (2006.01)
*E21B 43/00* (2006.01)
*C09K 8/524* (2006.01)

(52) U.S. Cl.
USPC ............. 166/265; 166/57; 166/243; 166/302; 166/304; 166/310; 166/371; 166/372; 507/248; 507/266

(58) Field of Classification Search .................. None
See application file for complete search history.

(56) References Cited

U.S. PATENT DOCUMENTS

| | | | | |
|---|---|---|---|---|
| 2,089,035 A | * | 8/1937 | Oberlin | 166/310 |
| 3,279,538 A | * | 10/1966 | Doscher | 166/263 |
| 3,455,394 A | * | 7/1969 | Knight | 166/371 |
| 3,566,970 A | * | 3/1971 | Crow et al. | 166/310 |
| 4,016,930 A | * | 4/1977 | Arnold | 166/266 |
| 4,347,899 A | * | 9/1982 | Weeter | 166/310 |
| 4,480,686 A | | 11/1984 | Coussan | |
| 5,197,545 A | * | 3/1993 | Oude Alink et al. | 166/372 |
| 5,762,138 A | * | 6/1998 | Ford et al. | 166/279 |
| 6,106,700 A | * | 8/2000 | Collins et al. | 208/188 |
| 6,379,612 B1 | * | 4/2002 | Reizer et al. | 422/7 |
| 2008/0179063 A1 | * | 7/2008 | Smith | 166/335 |
| 2009/0294123 A1 | * | 12/2009 | Mescall et al. | 166/250.01 |

OTHER PUBLICATIONS

Gallup and Curiale, Characterization of Sodium Emulsion Soaps Formed from Production Fluids of Kutei Basin, Indonesia; Energy & Fuels 2007, 21, pp. 1741-1759.

* cited by examiner

*Primary Examiner* — George Suchfield
(74) *Attorney, Agent, or Firm* — Steven L. Christian; John E. Vick; Parul Anderson

(57) ABSTRACT

The present invention is directed to a method and system for treating a well having a wellbore extending from a ground surface or subsea surface downhole to an oil producing formation. Oil producing formations are capable of generating formation fluids into a wellbore. Formation fluids are comprised of at least an oil fraction and an aqueous fraction. Emulsions may form during oil production, and such emulsions may be comprised of oil and water. Inhibitor compositions may be employed to break such emulsions.

33 Claims, 2 Drawing Sheets

METHODS AND SYSTEMS FOR TREATING SUBTERRANEAN WELLS

FIELD OF THE INVENTION

The invention is directed to methods, systems and compositions for treating hydrocarbon-based formation fluids within a subterranean well.

BACKGROUND

Hydrocarbons such as oil and gas are produced from subterranean wells. Hydrocarbons were formed millions of years ago by deposit of decayed plant matter into underground rock formations. There may be water located in underground formations at levels above or below hydrocarbon-bearing rock formations. Water-bearing geological zones often are penetrated by such subterranean oil and gas wells. It is common in the case of both land-based wells and subsea wells to produce from the wellbore both undesirable water and desirable oil in a combined mixture or emulsion. In many instances, water is removed from the emulsion in a water-oil separation process after the combined emulsion has been removed from the wellbore. Such separation processes are referred to as processes to "break" such emulsions.

Emulsions may cause serious flow assurance problems in the oil and gas production industry. Strong mineral acids sometimes are used to break emulsions. However, in certain geological regions of the world it has been found that some of the produced oil/water emulsions are very difficult to break into component oil and aqueous fractions after the emulsion is brought forth from the wellbore. Some crude oils contain chemical species that are believed to prevent successful breaking of such emulsions, even after exposure of the formation fluids to conventional strong mineral acid demulsifiers.

For example, at deepwater subsea oil and gas fields in some regions of the world, a floating production unit (FPU) may be employed to provide heat and strongly acidic demulsifiers to break the emulsions into salable oil and water. Depending upon the chemical characterization of the subterranean formation and formation fluids, it may require exceptionally large amounts of strong mineral acids and applied heat energy to produce a separated crude oil.

A challenge in the industry is to find improved compositions and methods for reliably separating difficult to break emulsions with a reduced amount of expensive applied heat energy and with a reduced amount of applied chemicals. Furthermore, a challenge in the industry is to find compositions that can accomplish the breaking of such emulsions without damaging or compromising metallic equipment with strong mineral acids. Many conventional strong mineral acid compositions used for this purpose are detrimental to oilfield equipment and associated tubulars.

This disclosure is directed to improved emulsion separation methods, systems and compositions.

SUMMARY OF THE INVENTION

A method of treating formation fluids within a subterranean well to produce a separated oil fraction is disclosed. The method may be practiced in a well having a wellbore extending from a ground surface or subsea surface to a point further below the surface (i.e. "downhole"). The well is adapted for producing formation fluids and has a wellbore extending from a ground surface or subsea surface downhole to an oil producing formation positioned below the ground surface or subsea surface. The oil producing formation is adapted for generating formation fluids into the wellbore. The formation fluids are comprised of at least an oil fraction and an aqueous fraction. In the method, it is useful to provide a conduit of some type (i.e. a mandrel, tubing, or other tubular as further described herein) in association with the wellbore. The conduit has a first end oriented toward the ground or subsea surface and a second end (also referred to herein as the "distal end") positioned downhole within the wellbore. The inhibitor is transported from the first end of the conduit to the second end of the conduit. Finally, the inhibitor composition is released from the second end of the conduit in the presence of subterranean heat energy and formation fluids, thereby forming treated formation fluids. In some instances, these treated formation fluids are able to be brought forth from the wellbore. Then, the treated formation fluids may readily be separated into aqueous and oil fractions, in part due to the treatment of the formation fluids with the inhibitor composition.

In some applications of the invention, the inhibitor composition comprises more than 25% by weight of alcohol-containing compounds. In other applications of the invention, the inhibitor composition includes at least one amine-containing compound.

The compositions employed in the process of the invention typically will be very low or in some instances free of highly ionized acids. By "highly ionized acids," it is meant the strong and commonly known inorganic mineral acids, including without limitation sulfuric, phosphoric, nitric, and hydrochloric acids. Specific applications of the invention may employ a weight percentage of the inhibitor composition representing highly ionized acids of less than 20% by weight. In other embodiments of the invention, the weight percentage of highly ionized acids in the inhibitor composition may be less than about 10% by weight.

The dosage of inhibitor composition required to achieve the separation into an oil fraction and aqueous fraction may be less than or equal to about 1100 ppm. The dosage of inhibitor composition required to achieve separation into the oil fraction and aqueous fraction may be less than or equal to 700 ppm in other specific embodiments of the invention.

In one embodiment of the invention, the oil fraction of the formation fluids includes carboxylic acid-containing species, while the aqueous fraction of the formation fluid comprises pH basic species. Furthermore, the inhibitor composition in that embodiment may be complexed or otherwise chemically associated with carboxylic acid-containing species in the oil fraction of the formation fluids, thereby substantially preventing the undesirable reaction of the carboxylic acid-containing species with pH basic species. It is believed that such complexation may assist in breaking the emulsions.

In some applications of the invention, the inhibitor composition may be released from a conduit 18 in the form of a gas lift mandrel downhole in the vicinity of the subterranean formation. The deposit of the inhibitor composition into the wellbore may be accomplished by employment of an umbilical or other conveyance conduit or system. Other means may be employed to bring such inhibitor compositions into contact with formation fluids to achieve the advantages of the invention.

In some applications of the invention, the inhibitor composition is selected from one or more compounds in the group of: aromatic alcohols, aliphatic alcohols, and amines. At least one application of the invention employs an aromatic alcohol. Other applications employ an aromatic alcohol comprising a benzyl alcohol. The inhibitor composition also may comprise an aliphatic alcohol in other applications, or a combination of such compounds. The aliphatic alcohol may include, for example, 2-butoxyethanol or related compounds. In some applications of the invention, the inhibitor composition is represented by an amine compound and a benzyl alcohol compound. At least one application of the invention employs an inhibitor composition with at least 30% by weight of an alcohol compound.

In one embodiment of the invention, a system is disclosed for treating a well to minimize emulsion formation in treated formation fluids. The well penetrates a subterranean formation and is adapted for producing formation fluids, the well having a wellbore extending from a ground surface or subsea surface downhole to an oil producing formation positioned below the ground surface or subsea surface. The oil producing formation is adapted for generating formation fluids into the wellbore, the formation fluids being produced from the wellbore being comprised of at least an oil fraction and an aqueous fraction. The system includes a conduit in association with the wellbore, the conduit having a first end oriented toward the ground or subsea surface and a second end positioned downhole within the wellbore. The system also employs an inhibitor composition, wherein the inhibitor composition is made available for deployment into the first end of the conduit and adapted for release from the second or distal end of the conduit in the presence of subterranean heat energy. Further, formation fluids are present within the wellbore, wherein the oil fraction of the formation fluids comprises carboxylic acid-containing species and the aqueous fraction of the formation fluids comprises pH basic species, wherein the inhibitor composition is adapted for complexing downhole with the carboxylic acid-containing species in the oil fraction of the formation fluids in the presence of subterranean heat energy. The inhibitor composition is selected from one or more compounds in the group of: aromatic alcohol compounds, aliphatic alcohol compounds, and amine compounds. Furthermore, in various embodiments of the invention, the conduit may comprise an umbilical or a gas list mandrel or any other suitable tubular structure capable of releasing the inhibitor composition at the desired position into the wellbore.

The invention may be represented by the oil fraction that is produced according to the methods and systems described herein.

BRIEF DESCRIPTION OF THE FIGURES

The performance of the inhibitor compositions employed in the process of the invention may be observed by reference to one or more Figures as follows.

DETAILED DESCRIPTION OF THE INVENTION

While the invention described herein is not limited to application to any particular class of crude oils, it is believed that certain difficult to break crude oils contain elevated levels of certain chemical compounds that render emulsions of such oils quite difficult to break. Compounds within such oils believed to be a contributing cause for such difficulty include sodium alkyl benzoates. Furthermore, it is believed that the combination of waxes and alkyl benzoic acids in some crude oils may result in emulsions that are particularly difficult to break into component oil and aqueous fractions.

In the practice of the invention, inhibitor compositions can be applied on the surface or downhole. However, there are distinct advantages to providing such compositions downhole into the wellbore. First, one may take advantage of the available heat energy in the formation for effecting the chemical complexation of the inhibitor composition as further described herein. It is believed that by applying the inhibitor compositions downhole, it is possible to avoid treatment of formation fluids on the surface with strong mineral acid demulsifiers. Using little or no strong mineral acids in the treatment of emulsions reduces corrosion and scaling in piping and equipment. Also, by contacting the formation fluids, including the aqueous fraction, with inhibitor composition before the emulsion is fully formed, it is possible to avoid or minimize emulsion formation during the time period during which the formation fluids are flowing through the wellbore to the ground surface. This "early intervention" with a non-acid demulsifier has shown to provide very significant advantages in the practice of the invention.

Figure 1:
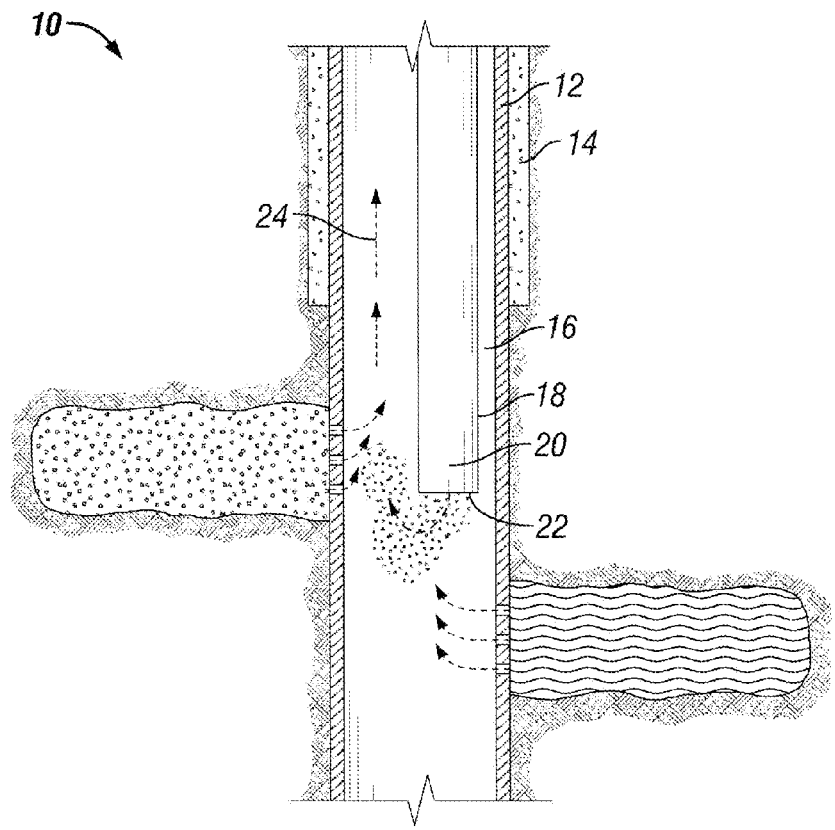
FIG. 1 shows one manner of deploying the inhibitor composition downhole through a conduit for release into a wellbore.

FIG. 1 shows one manner of deploying the inhibitor composition downhole into a wellbore for contact with formation fluids. In the method, it is useful to provide a conduit of some type (i.e. a mandrel, tubing, or other tubular as further described herein) in association with the wellbore. The conduit has a first end oriented toward the ground or subsea surface and a second end (also referred to herein as a "distal" end) positioned downhole within the wellbore. Then, the inhibitor is transported from the first end of the conduit to the second end of the conduit, further in the downhole direction. Finally, the inhibitor composition is released from the second or distal end of the conduit in the presence of subterranean heat energy and formation fluids, thereby forming treated formation fluids for production from the wellbore. These treated formation fluids are then brought forth from the wellbore. Then, upon the surface, they may be readily separated into aqueous and oil fractions.

With specific reference to FIG. 1, the subterranean formation 10 comprises a casing 12 held into the subterranean formation 10 by cement 14. The wellbore 16 is adapted to receive a conduit 18. In some applications of the invention, the conduit 18 comprises an umbilical, and in other applications the conduit 18 may be a gas lift mandrel or other tubular. The distal end 20 of conduit 18 is adapted for release of inhibitor composition from the opening 22 into the wellbore 16. The first end of the conduit 18 is not shown in the FIG. 1. Formation fluids within the wellbore comprise an oil fraction and an aqueous fraction that migrate into the wellbore 16 from different zones in the formation 10. Then, the formation fluids combine with the inhibitor composition which has been released from the distal end 20 of conduit 18 to form treated formation fluids. The treated formation fluids 24 migrate upwards to be produced at the ground or subsea surface (not shown).

Application of the inhibitor compositions downhole may be accomplished using as a conduit a gas lift mandrel, as one example. Mandrels such as that disclosed in U.S. Pat. No. 4,480,686 to Coussan et al (Daniel Industries, Inc. of Houston, Tex.) are designed to deliver gas to the tubing casing annulus. Such mandrels may be employed to deliver inhibitor compositions in the practice of the invention, including inhibitor compositions to the appropriate downhole location for treatment of formation fluids. Other mandrels such as those manufactured by Tejas Researching and Engineering, LP of the Woodlands, Tex. (disclosed on the internet at www-.tejasre.com) may be employed in a similar manner to achieve downhole application of the inhibitor compositions.

Umbilicals sometimes are used in connection with subsea wells, and such umbilicals may extend from an offshore platform to the subsea production apparatus on the ocean floor, or even extend downhole for deposit of umbilical contents into the wellbore. Umbilicals of this type may be employed to deliver the inhibitor compositions, as further described herein.

In one embodiment of the invention, a chemical pump (not shown) removes by suction the inhibitor composition from a 55 gallon drum and into an umbilical. An umbilical of about ⅜ inches in diameter can work well in many applications. The amount of inhibitor composition needed in a given well will depend upon production volume, chemical or pH characteristics of a particular produced crude oil, and other factors. In some embodiments, about 200 to 1200 part per million volume (ppmv) of the inhibitor composition may be applied into a well. In yet another aspect of the invention, about 450 part per million volume (ppmv) of the inhibitor composition may be applied into a well. Each well produces different volumes of total formation fluids. If a well is producing about 1,000 barrels per day of emulsion, the injection rate for the inhibitor composition may desirably be about 0.45 barrels of inhibitor composition per day (BPD) into the wellbore. This is just one example of a treatment regime that has been known to work well. In a preferred embodiment, the inhibitor composition is applied "neat," as received from the manufacturer, but dilution could be accomplished if needed or desirable. Once a new well is drilled and an emulsion of the type described herein is found, it then may be advantageous to begin injecting the inhibitor composition down into the wellbore 16 through conduit 18.

In the West Seno oilfield in Indonesia, the injection depth for the inhibitor composition is about 4,000 feet below the subsea floor. The oilfield in the case of West Seno is positioned in 3,000 feet of water, so the umbilical or gas lift mandrel is set to release inhibitor composition at a depth of about 7,000 feet below the ocean surface. In many applications of the invention, a depth of at least about 2,000 feet below a ground or subsea surface will be needed to locate and employ sufficient natural underground heat energy to accomplish the good results in the practice of the invention.

The amount of underground heat energy needed to achieve the greatest results in emulsion removal may depend upon the type of emulsion present in a given application. In West Seno, a reservoir temperature of about 145 degrees F. provides very good results which allows for complexation of the inhibitor composition with the formation fluids in a manner to substantially avoid an undesirable "tight" emulsion. In the laboratory, good results may be obtained by heating the emulsion to about 145 degrees F.

Preferred temperatures for application of the invention are usually at least 120 degrees F., but could vary depending upon the chemical nature and carbon chain length of the crude oil involved. Actual subterranean working temperatures of between 120 and 230 degrees F. could be employed in the practice of this invention. In general, it is believed that a temperature of at least 120 degrees F. is needed for best results. In other applications, a temperature of 140 degrees may be needed, depending upon the crude oil characteristics, and the chemical nature of the aqueous fraction, and the chemical features of the inhibitor composition. As the reservoir temperature increases, the dosage of the inhibitor composition may be decreased in some cases (i.e. greater activation) until it is possible to achieve a greater than 80% emulsion breaking at the wellhead.

Laboratory screening tests of certain sodium soap emulsion ("SSE") inhibitors have shown that several inhibitor compositions when heated in the presence of the emulsion perform well to break emulsions more efficiently and effectively than other mineral acid demulsifiers. Coupled with reservoir or applied heat, such inhibitors may desirably break emulsions quickly and at a reasonably low dosage. The inhibitor compositions of the invention are believed to be effective in many instances to inhibit sodium alkyl benzoates and sodium n-alkanoates by way of a complexation mechanism. However, the exact mechanism of such chemical complexation is not known, and the invention herein is not limited to any particular mechanism or manner of operation of such inhibitor compositions.

In some instances, inhibitor compositions of the invention are effective to eliminate or reduce the need to treat formation fluids on the surface, which may provide several benefits. First, there may be a substantial energy savings in the process if heat from the underground formation is employed, instead of or in addition to the application of generated heat by heating devices at the ground or sea surface. The invention, however, is not limited to only methods that employ subterranean heating sources. Further, as indicated, the inventive method potentially could be used for surface treatment of produced formation fluids that have emulsified, rather than by application downhole.

The use of inhibitor compositions that do not require large amounts of strong mineral acids may assist in reducing corrosion and undesirable scale formation in oil production equipment. Additionally, it is possible in many instances to break emulsions more completely and effectively while using the methods of the invention, with minimal amounts of chemical composition employed.

Inhibitor compositions for deployment in the practice of the invention may be provided in many different formulations, including those shown herein and others which are not specifically shown, but may be contemplated by the spirit and scope of this disclosure.

Description and Data Analysis

The invention may be employed in many different regions of the world, and is not limited to any particular type of crude oil emulsion. Many produced crude oils for various chemically related reasons present difficult to break emulsions. The example recited herein with respect to the West Seno oilfield of Indonesia is just one example of how the various embodiments of the invention may be employed in practice. Other oilfields in other regions of the world will present similar difficulties with breaking of other difficult to break emulsions. Crude oil emulsions from other fields may present similar difficulties due to chemical or pH characteristics of the formation fluids in such other emulsions. Such other difficult to break emulsions may be effectively broken by employing the methods of the invention.

For purposes of this disclosure, the "new sand" shall refer to a particular formation of the West Seno, Indonesia field that has been known to produce emulsions that are found to be particularly difficult to break. API gravity of crude oils produced from the West Seno new sand is typically less than that produced from other known sands at West Seno field. For example, an API of 25 for oil from the new sand may be compared to an API of about 40 for other conventional sands in this oil producing region. The total acid number (TAN) of crude oils produced from the new sand is about 0.75 mg KOH/g compared to about 0.50 mg KOH/g of oil produced from other West Seno sands.

Figure 2:
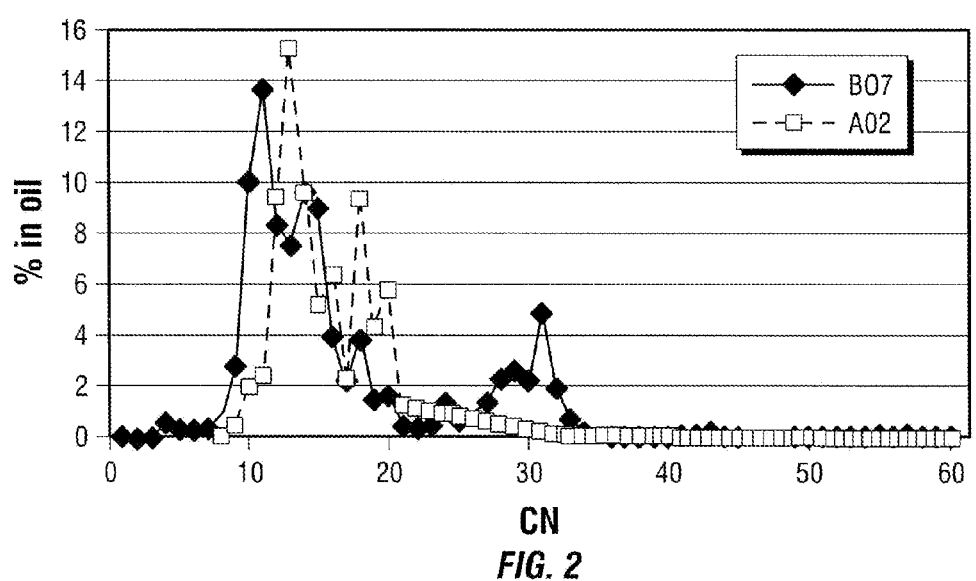
FIG. 2 is directed to a gas chromatograph showing differences in the fingerprints of a conventional crude oil of the West Seno, Indonesia sands (A02) as compared to oil from a new West Seno sand (B07) that has been found to form emulsions which are very difficult to break using conventional methods and compositions.

Gas chromatograph fingerprints of two different crude oils in West Seno, Indonesia show significant differences in composition. In FIG. 2, the gas chromatograph ("GC") fingerprints of these two produced crude oils are overlain for comparison. Type B07 oil is from the a relatively newly discovered sand, and has been found to produce very difficult emulsions which are difficult to break. The B07 oil exhibits a very different gas chromatograph fingerprint as compared to A02 oil. The A02 oil, however, is a known common West Seno crude oil.

The CN distribution of B07 oil shows a maximum at $C_{11}$, as compared to a maximum at $C_{13}$ in A02 oil. The B07 oil exhibits two distinct modes. Above $C_{20}$, herein defined as wax/paraffin, the B07 oil contains about 24% of such components, while the A02 sample contains only about 16%. So, it may be seen that this particularly difficult to break crude oil from the new sand is significantly higher in wax and paraffin content. Furthermore, the pristine/phytane ratio for B07 oil is about 4.2 compared to about 4.9 for A02 oil. Thus, the new sand completion wells produce oil that is different in chemical composition compared to A02 and previously characterized oils and emulsions from this geographical region.

Emulsions were extracted, dried and subjected to mass spectral and gas chromatographic techniques. The mass spectrophotometry ("APCI-MS") and high temperature gas chromatograph ("HTGC") spectra of the difficult to break emulsions are clearly different from the common emulsions. The spectra of the difficult acids show the presence of alkyl benzoic acids and monocyclic acid. The APCI-MS (negative ion) exhibits prominent peaks that are tentatively identified as $C_{24}$ and $C_{29-31}$ alkyl benzoic acids, and $C_{27}$ monocyclic naphthenic acid. A small group of peaks is centered near m/z=829.8 are assigned as $C_{54}$-$C_{61}$ alkyl benzoic acids and $C_{58}$ acyclic acid. The emulsions were nearly absent of sodium n-alkanoates that are present in all other West Seno wells and Kutei Basin fields. In contrast, the APCI-MS of the common crude oil emulsion exhibits dominant peaks assigned to $C_{20}$-$C_{34}$ and $C_{58}$ n-alkanoic acids.

Peaks located during analysis of the difficult hard to break emulsions appear to be due to a mixture of acids, with alkylbenzoic acids predominating. On the other hand, the analogous HTGC of common West Seno crude oil emulsion reveals the methyl esters of $C_{22}$-$C_{36}$ acyclic acids. Thus, in the practice of the invention it is possible to deploy a non-acid or low acid treatment chemical to mitigate umbilical and downhole corrosion potential. By "non-acid" herein, it is meant the use of an inhibitor composition with a low amount or a complete absence of strong mineral acids.

Various inhibitor compositions were tested to determine the performance of each composition. A number of commercially available demulsifiers and naphthenate inhibitors were obtained from several chemical vendors. The inhibitor compositions tested are shown below in Table 1. It has been found that the downhole injection of an inhibitor composition may in some instances substantially reduce chemical dosing rates and costs as compared to conventional techniques.

TABLE 1

Inhibitor Compositions Employed in Testing

| Inhibitor Composition Chemical | Commercial Trade Name | Ingredients (Weight Percentage) |
|---|---|---|
| Chemical A | MI Swaco EB8500 ™ | 85% H3PO4 15% isopropyl alcohol |
| Chemical B | MI Swaco EPT2101 ™ | 60% 2-butoxyethanol, 5% acetic acid, 5% xylene, 1% ethylbenzene, 29% petroleum residue |
| Chemical C | REP Naphten 3 ™ | 2.5% amine, 2.5% H3PO4, 10% ester, 85% benzyl alcohol |
| Chemical D | REP Naphten 2 ™ | 2.5% amine, 10% ester, 87.5% benzyl alcohol |
| Chemicals E-K | AlphaOmega ™ 50, 110, 120, 130, 135, 200, 210 | polymeric dispersants |

In the first series of laboratory screening tests, the treatment chemicals shown in Table 1 were applied directly to existing emulsions obtained from West Seno field. The samples tested were essentially 100% emulsions (essentially no water separation and only traces of floating oil). The emulsions were heated to 65° C. and then were treated with respective test demulsifiers or inhibitors by hand shaking for about 1 minute. The mixtures were allowed to stand at 65° C. for 5 minutes. The phases were then observed and the oil, water and residual emulsion volumes were recorded. Chemical additions were continued until the emulsion completely disappeared leaving black colored oil and relatively clear water.

For comparison purposes, a phosphoric acid-based demulsifier (also referred to herein as the "incumbent acid demulsifier" or "Chemical A") was included in the study. Chemical A comprises about 85% of a strong mineral acid, phosphoric acid. FIG. 2 graphically depicts the results of using increasing dosage of the phosphoric acid-containing demulsifier (Chemical A). As shown in FIG. 2, a very high dosage of over 2,000 ppm of the incumbent acid demulsifier was required to completely break the D07 emulsion. Such a dosage is very costly and not desirable.

Figure 3:
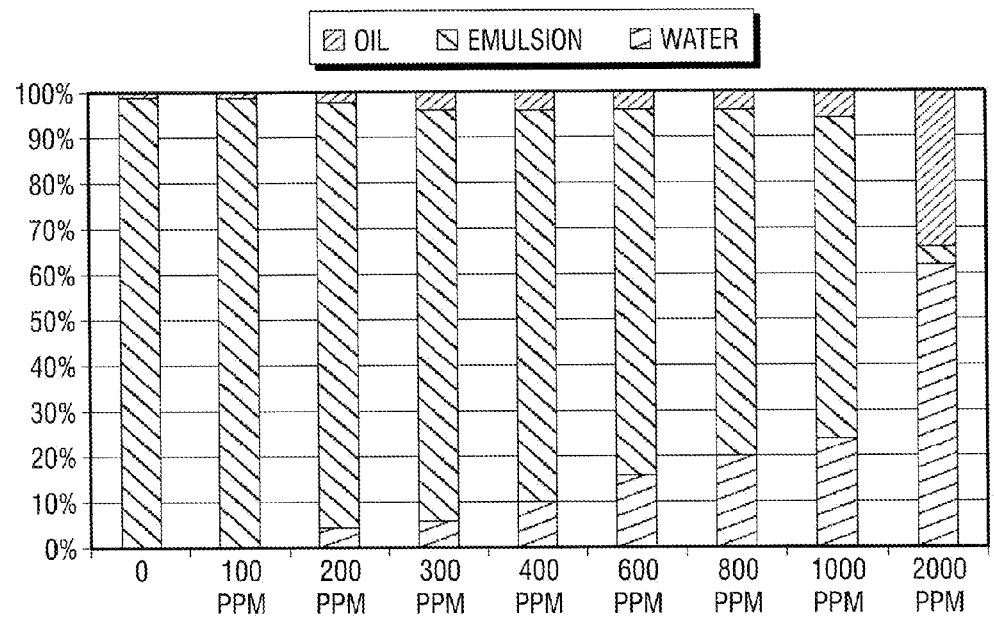
FIG. 3 illustrates the emulsion breaking performance of Chemical A, which is a conventional strong mineral acid containing composition comprised of about 85% phosphoric acid.
Figure 4:
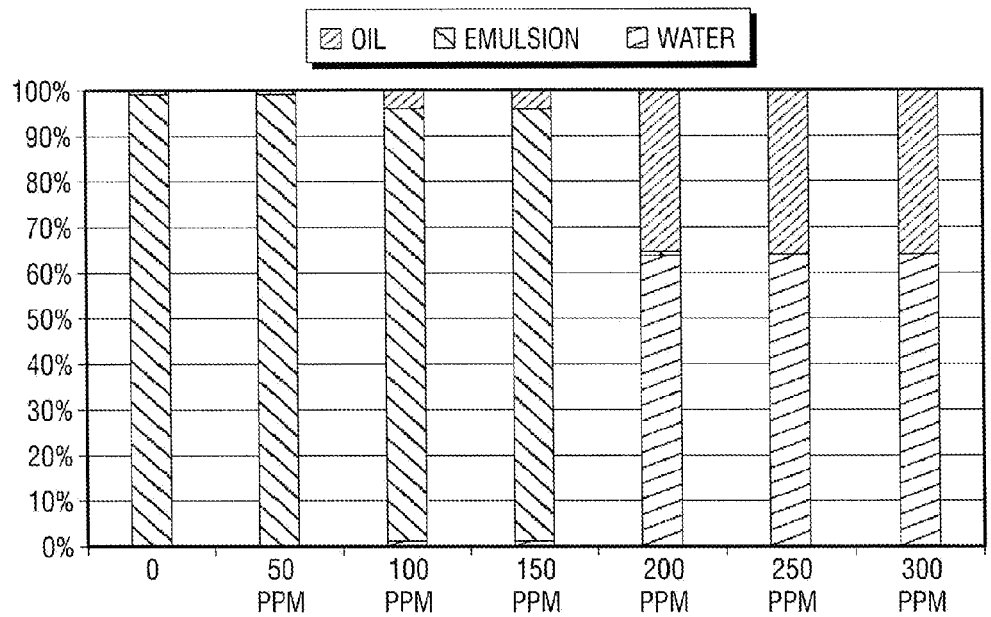
FIG. 4 reveals the emulsion breaking performance of inhibitor composition Chemical B, an inhibitor composition that is substantially free of strong mineral acids which may be employed in the practice of the invention.

FIG. 3 shows the results of treating such crude oil emulsions with one of the inhibitor compositions adapted for deployment in the method of the invention (Chemical B). Chemical B comprises about: 60% 2-butoxyethanol, 5% acetic acid, 5% xylene, 1% ethylbenzene, and 29% petroleum residue. The use of the inhibitor composition Chemical B efficiently broke the same emulsion type (i.e. D07 emulsion) at a very low dosage of between 200 and 250 ppm.

The D07 emulsion is an emulsion of oil in water. The emulsion consists of carboxylic acids in oil with saponification by pH basic components of produced water to form surface active agents (soaps). These soaps stabilize the emulsion against separation into oil and water phases. The carboxylic acids in the oil are dominated by alkyl benzoic acids. Also present are acrylic and cyclic naphthenic acids. The basic components of the formation water are sodium bicarbonate and sodium acetate. When the two are mixed, sodium carboxylates (soaps) are formed at the interface causing emulsification of oil in water. The soaps are at substantial concentrations that lead to a completely emulsified mixture that has essentially no salable oil available until heat and inhibitor composition have reacted with the soaps to destroy the emulsion. This then allows the free oil to float on the water phase for easy separation in conventional oil-water separation equipment. The oil then may be collected and sold, while the water may be discharged or re-injected back into the formation for secondary recovery, also known as waterflooding.

The dosages (ppm) of each of the inhibitor compositions A through K (shown in Table 1) which were required to break the D07 emulsion into 36% oil and 64% water are shown herein in Table 2. It can be seen that Chemical B performed the breaking of the emulsion at the lowest dosage, followed by Chemical C and Chemical D, respectively. Chemicals A, E, F, G, H, I, J, and K, which are comprised primarily of polymeric dispersants, were significantly less effective in breaking the emulsion.

TABLE 2

Dosages of Inhibitor Composition Required to Break Emulsion into 36% Oil and 64% Water

| Inhibitor Composition Chemical Designation | Approximate Dosage Required to Break Emulsion (ppm) |
|---|---|
| A | >2000 |
| B | 200-250 |
| C | 900 |
| D | 1100 |
| E | >2500 |
| F | >2500 |
| G | >2500 |
| H | >2500 |
| I | >2500 |
| J | >2500 |
| K | >2500 |

A second "difficult" emulsion from well B07, which had very low water cut, was examined and tested as well. Table 3 presents the results for the chemical screening of this "difficult" emulsion.

TABLE 3

Dosages of Inhibitor Composition Required to Break Emulsion into 96% Oil and 4% Water

| Inhibitor Composition Chemical Designation | Dosage Required to Break the Difficult Emulsion (ppm) |
|---|---|
| A | 750 |
| B | 200 |
| C | 300 |
| D | >2500 |
| E | >2500 |
| F | >2500 |
| G | >2500 |
| H | >2500 |
| I | >2500 |
| J | >2500 |
| K | >2500 |

Table 3 shows similar results, with inhibitor composition Chemical B breaking the emulsion at the lowest dosage, followed by Chemical C and Chemical A, respectively. However, in the results shown in Table 3, Chemical A actually outperformed Chemical D in breaking the D07 emulsion. In this testing, the polymeric dispersants of Chemicals D-K were significantly less effective in breaking the emulsion.

To further understand the behavior of Chemicals E-K, oil from well A02 that forms the common or conventional emulsion was initially treated with the inhibitor compositions. Next, a 50 volume percent synthetic produced water was blended with 50 volume percent of the oil to generate an emulsion. The simulated produced water consisted of 7,400 mg/L $Na^+$, 50 mg/L $Ca^{2+}$, 1,200 mg/L $HCO_3^-$, 2,150 mg/L $CH_3COO^-$, and 11,500 mg/L of $Cl^-$, and exhibited a natural pH of about 7.2.

Upon standing for about 5 minutes at 65° C., just slightly less than 50% oil, 30% brown emulsion and 20% free water was observed. The amount of Chemicals A, B, C, and D required to break the emulsion into 50% each of oil and water is shown herein in Table 4.

TABLE 4

Dosages of Inhibitor Composition Required to Break Emulsion into 50% Oil and 50% Water

| Inhibitor Composition Chemical Designation | Dosage Required to Break the Emulsion (ppm) |
|---|---|
| A | 450 |
| B | 250 |
| C | 250 |
| D | 250 |

It can be seen from the results in Table 4 that Chemicals B, C, and D were equally effective in breaking the emulsion, while Chemical A was significantly less effective (on a ppm basis) in breaking the emulsion.

This disclosure and description of the invention are illustrative, and various changes in the method of deployment or chemical composition of the invention may be employed without departing from the spirit and scope of the invention.

What is claimed is:

1. A method of treating formation fluids in a well which penetrates a subterranean formation, the well being adapted for producing formation fluids, the well having a wellbore extending from a ground surface or subsea surface downhole to an oil producing formation positioned below the ground surface or subsea surface, the oil producing formation being adapted for generating formation fluids into the wellbore, the formation fluids being comprised of at least an oil fraction and an aqueous fraction, comprising the steps of:
    (a) providing a conduit in association with the wellbore, the conduit having a first end oriented toward the ground or subsea surface and a distal end positioned downhole within the wellbore;
    (b) transporting inhibitor composition from the first end of the conduit to the distal end of the conduit, wherein the inhibitor composition comprises an amine compound and an aromatic alcohol compound; and
    (c) releasing inhibitor composition from the distal end of the conduit into the wellbore in the presence of subterranean heat energy and formation fluids, thereby forming treated formation fluids.

2. The method of claim 1 wherein the inhibitor composition comprises more than 25% by weight of alcohol compounds.

3. The method of claim 1 wherein the weight percentage of the inhibitor composition which comprises highly ionized acids is less than about 20% by weight.

4. The method of claim 1 wherein the weight percentage of highly ionized acids in the inhibitor composition is less than about 10% by weight.

5. The method of claim 1 comprising the additional step of:
    (d) separating the treated formation fluids into an aqueous fraction and oil fraction.

6. The method of claim 1 wherein the subterranean heat energy applied is at least about 120 degrees F.

7. The method of claim 1 wherein the oil fraction of the formation fluids comprises carboxylic acid-containing species and the aqueous fraction of the formation fluids comprises pH basic species, the method additionally comprising complexing the inhibitor composition with carboxylic acid-containing species in the oil fraction of the formation fluids, thereby substantially preventing reaction of the carboxylic acid-containing species with the pH basic species.

8. The method of claim 1 wherein the inhibitor composition is released from a gas lift mandrel for delivery of the inhibitor composition downhole.

9. The method of claim 1 wherein the inhibitor composition is released at a depth of at least about 2,000 feet below the ground surface or subsea surface.

10. The method of claim 1 wherein the aromatic alcohol comprises a benzyl alcohol.

11. The method of claim 1 wherein the inhibitor composition further comprises an aliphatic alcohol.

12. The method of claim 11 wherein the aliphatic alcohol comprises 2-butoxyethanol.

13. The method of claim 1 wherein the inhibitor composition is released at a depth of at least about 2,000 feet below the ground or subsea surface and the temperature within the wellbore at which the inhibitor composition is released is at least about 140 degrees F.

14. The method of claim 1 wherein the inhibitor composition comprises at least 30% by weight of an alcohol compound.

15. A system for treating formation fluids in a well to minimize emulsion formation in treated formation fluids, the well penetrating a subterranean formation, the well being adapted for producing formation fluids, the well having a wellbore extending from a ground surface or subsea surface downhole to an oil producing formation positioned below the ground surface or subsea surface, the oil producing formation being adapted for generating formation fluids into the wellbore, the formation fluids being produced from the wellbore being comprised of at least an oil fraction and an aqueous fraction, the oil fraction of the formation fluids comprising carboxylic acid-containing species and the aqueous fraction of the formation fluids comprising pH basic species, the system comprising:
(a) a conduit in association with the wellbore, the conduit having a first end oriented toward the ground or subsea surface and a distal end positioned downhole within the wellbore;
(b) an inhibitor composition, the inhibitor composition being made available for deployment into the first end of the conduit and adapted for release from the second end of the conduit in the presence of subterranean heat energy, wherein the inhibitor composition is selected from one or more compounds from the group of: aromatic alcohol compounds, aliphatic alcohol compounds, and amine compounds, and wherein the inhibitor composition is adapted for complexing with carboxylic acid-containing species in the oil fraction of the formation fluids to substantially prevent reaction of the carboxylic acid-containing species with the pH basic species.

16. The system of claim 15 wherein the inhibitor composition comprises more than 25% by weight total of alcohol compounds.

17. The system of claim 15 wherein the inhibitor composition further comprises at least one amine-containing compound.

18. The system of claim 15 wherein the weight percentage of the inhibitor composition which comprises highly ionized acids is less than about 20% by weight.

19. The system of claim 15 wherein the conduit comprises at least in part an umbilical.

20. The system of claim 15 wherein the conduit comprises at least in part a gas lift mandrel.

21. The system of claim 15 wherein the subterranean heat energy applied is at least about 120 degrees F.

22. The system of claim 15 wherein the inhibitor composition is released at a depth of at least about 2,000 feet below the ground surface or subsea surface.

23. The system of claim 15 wherein the inhibitor composition comprises an aromatic alcohol.

24. The system of claim 23 wherein the aromatic alcohol comprises a benzyl alcohol.

25. The system of claim 15 wherein the inhibitor composition comprises an aliphatic alcohol.

26. The system of claim 25 wherein the aliphatic alcohol comprises 2-butoxyethanol.

27. The system of claim 15 wherein the inhibitor composition is released at a depth of at least about 2,000 feet below the ground or subsea surface and the temperature at position within the wellbore at which the inhibitor composition is released is at least about 120 degrees F.

28. A method of treating formation fluids in a well which penetrates a subterranean formation, the well being adapted for producing formation fluids, the well having a wellbore extending from a ground surface or subsea surface downhole to an oil producing formation positioned below the ground surface or subsea surface, the oil producing formation being adapted for generating formation fluids into the wellbore, the formation fluids being comprised of at least an oil fraction and an aqueous fraction, wherein the oil fraction of the formation fluids comprises carboxylic acid-containing species and the aqueous fraction of the formation fluids comprises pH basic species, the method comprising the steps of:
(a) providing a conduit in association with the wellbore, the conduit having a first end oriented toward the ground or subsea surface and a distal end positioned downhole within the wellbore;
(b) transporting inhibitor composition from the first end of the conduit to the distal end of the conduit;
(c) releasing inhibitor composition from the distal end of the conduit into the wellbore in the presence of subterranean heat energy and formation fluids; and
(d) complexing the inhibitor composition with carboxylic acid-containing species in the oil fraction of the formation fluids, thereby substantially preventing reaction of the carboxylic acid-containing species with the pH basic species, thereby forming treated formation fluids.

29. The method of claim 28 wherein the inhibitor composition comprises more than 25% by weight of alcohol compounds.

30. The method of claim 28 wherein the weight percentage of the inhibitor composition which comprises highly ionized acids is less than about 20% by weight.

31. The method of claim 28 wherein the subterranean heat energy applied is at least about 120 degrees F.

32. The method of claim 28 wherein the inhibitor composition is released at a depth of at least about 2,000 feet below the ground surface or subsea surface.

33. The method of claim 28 wherein the inhibitor composition comprises at least one compound selected from the group consisting of: aromatic alcohol compounds, aliphatic alcohol compounds, and amine compounds.

* * * * *